(12) United States Patent
Awadh et al.

(10) Patent No.: US 11,117,115 B2
(45) Date of Patent: Sep. 14, 2021

(54) CARBON NANOFIBER GRAFTED POLYURETHANE COMPOSITE FOR SEPARATION OF NONPOLAR COMPONENTS FROM WATER

(71) Applicant: King Fahd University of Petroleum and Minerals, Dhahran (SA)

(72) Inventors: Tawfik Abdo Saleh Awadh, Dhahran (SA); Nadeem Baig, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 16/351,720

(22) Filed: Mar. 13, 2019

(65) Prior Publication Data

US 2020/0290015 A1 Sep. 17, 2020

(51) Int. Cl.
| | | |
|---|---|---|
| *B01J 20/20* | (2006.01) | |
| *B01J 20/28* | (2006.01) | |
| *B01J 20/32* | (2006.01) | |
| *B01J 20/34* | (2006.01) | |
| *C09K 3/32* | (2006.01) | |
| *C02F 1/28* | (2006.01) | |
| *B01J 20/26* | (2006.01) | |
| *C02F 101/32* | (2006.01) | |
| *C02F 103/08* | (2006.01) | |

(52) U.S. Cl.
CPC ........... *B01J 20/205* (2013.01); *B01J 20/262* (2013.01); *B01J 20/28004* (2013.01); *B01J 20/28023* (2013.01); *B01J 20/28045* (2013.01); *B01J 20/28059* (2013.01); *B01J 20/28061* (2013.01); *B01J 20/28083* (2013.01); *B01J 20/28085* (2013.01); *B01J 20/324* (2013.01); *B01J 20/3212* (2013.01); *B01J 20/3217* (2013.01); *B01J 20/3416* (2013.01); *C02F 1/288* (2013.01); *C09K 3/32* (2013.01); *C02F 1/283* (2013.01); *C02F 1/285* (2013.01); *C02F 2101/32* (2013.01); *C02F 2103/08* (2013.01); *C02F 2303/16* (2013.01)

(58) Field of Classification Search
CPC ........ B01J 20/20; B01J 20/205; B01J 20/262; B01J 20/28004; B01J 20/28023; B01J 20/28045; B01J 20/28059; B01J 20/28061; B01J 20/28083; B01J 20/28085; B01J 20/3212; B01J 20/3217; B01J 20/324; B01J 20/3416; C02F 1/288; C02F 1/283; C02F 1/285; C02F 2101/32; C02F 2102/08; C02F 2303/16; C09K 3/32
USPC ......................................................... 428/1.1
See application file for complete search history.

(56) References Cited

U.S. PATENT DOCUMENTS 7,029,603 B2    4/2006    Wang et al.

FOREIGN PATENT DOCUMENTS

| CN | 106589282 A | 4/2017 |
|---|---|---|
| CN | 107312198 A | 11/2017 |
| KR | 10-1398165 | 5/2014 |

OTHER PUBLICATIONS

Baig, et al. ; Initiator-Free Natural Light-Driven Vapor Phase Synthesis of a Porous Network of 3D Polystyrene Branched Carbon Nano_ber Grafted Polyurethane for Hexane /Water Separation ; ChemistrySelect vol. 3, Issue 28 ; Abstract Only ; 2 Pages.
Wang, et al. ; Preparation, Characterization, and Properties of Polyurethane-GraftedMultiwalled Carbon Nanotubes and Derived Polyurethane Nanocomposites ; Hindawi Publishing Corporation ; Journal of Nanomaterials vol. 2011, Article ID 814903 ; 10 Pages.
Hong, et al. ; Polyurethane foam coated with a multi-walled carbon nanotube/polyaniline nanocomposite for a skin-like stretchable array of multi-functional sensors ; NPG Asia Materials (2017) ; Nov. 17, 2017 ; 10 Pages.
Al-Saleh, et al. ; A review of vapor grown carbon nanofiber/polymer conductive composites ; Carbon, vol. 47, Issue 1 ; pp. 2-22 ; Jan. 2009 ; Abstract Only ; 2 Pages.
Bariock, et al. ; Effect of nanofiber on material properties of vapor-grown carbon nanofiber reinforced thermoplastic polyurethane (TPU/CNF) nanocomposites prepared by melt compounding ; Composites Part A: Applied Science and Minufacturing, vol. 41, issue 10 ; pp. 1471-1482 ; Oct. 2010 ; Abstract Only ; 1 Page.

*Primary Examiner* — Edward M Johnson
(74) *Attorney, Agent, or Firm* — Oblon, McClelland, Maier & Neustadt, L.L.P.

(57) ABSTRACT

A composite of polyurethane foam grafted with carbon nanofibers is described. This composite foam may be made by contacting and drying a polyurethane foam with a suspension of carbon nanofibers and then drying. Additional carbon nanofiber layers may be added with repeated contacting. The composite film has a high surface area of 276 m²/g and a hydrophobic character that may be exploited for separating an oil phase from water.

20 Claims, 11 Drawing Sheets

CARBON NANOFIBER GRAFTED POLYURETHANE COMPOSITE FOR SEPARATION OF NONPOLAR COMPONENTS FROM WATER

STATEMENT REGARDING PRIOR DISCLOSURES BY THE INVENTORS

Aspects of this technology are described in an article, Baig, N. and Saleh, T. A., "Initiator-Free Natural Light-Driven Vapor Phase Synthesis of a Porous Network of 3D Polystyrene Branched Carbon Nanofiber Grafted Polyurethane for Hexane/Water Separation," *Chemistry Select* 3(28):8312-8318, Jul. 30, 2018, DOI: 10.1002/slct.201801549, which is incorporated herein by reference in its entirety.

STATEMENT OF ACKNOWLEDGEMENT

This project was prepared with financial support from King Abdulaziz City for Science and Technology (KACST) through the Science & Technology Unit at King Fand University of Petroleum & Minerals (KFUPM): Project no. 14-PET393-04, as part of the National Science, Technology and Innovation Plan.

BACKGROUND OF THE INVENTION

Technical Field

The present invention relates to a composite of a carbon nanofiber grafted onto a polyurethane foam, a method of making the composite, and a method of using the composite to separate nonpolar components from contaminated water.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Undesirable oil spillage is becoming a more frequent event as modern society's increasing need for energy production leads to higher demands of rapid offshore oil transportation. See H. Hu, Z. Zhao, Y. Gogotsi, J. Qiu, Environ. Sci. Technol. Lett. 1 (2014) 214, incorporated herein by reference in its entirety. The most serious oil spillage incident was witnessed in the Gulf of Mexico in 2010. See J. Zhang, S. Seeger, Adv. Funct. Mater. 21 (2011) 4699, incorporated herein by reference in its entirety. This incident seriously affected the coast and the ocean near the oilfield. However, oil spillage is not only a major environmental concern; it is also wastage of a non-replenishable energy source. Due to the regular oil spill accidents and the continuous increase in the industrial wastewater containing oils, techniques to separate oil from water is a crucial challenge worldwide. See Z. Xue, S. Wang, L. Lin, L. Chen, M. Liu, L. Feng, L. Jiang, Adv. Mater. 23 (2011) 4270, incorporated herein by reference in its entirety. Water/oil separation is a hot area of research, and many materials are being introduced to achieve and refine the separation of oil and water for environmental and industrial applications.

Numerous materials have been established for oil and water separation based on their specific wettability. See Q. Wen, J. Di, L. Jiang, J. Yu, R. Xu, Chem. Sci. 4 (2013) 591, incorporated herein by reference in its entirety. Few materials have been synthesized with the properties of hydrophobicity and oleophilicity suitable for removing oil from water. See P. Calcagnile, D. Fragouli, I. S. Bayer, G. C. Anyfantis, L. Martiradonna, P. D. Cozzoli, R. Cingolani, A. Athanassiou, ACS Nano 6 (2012) 5413; W. Zhang, Z. Shi, F. Zhang, X. Liu, J. Jin, L. Jiang, Adv. Mater. 25 (2013) 2071; Y. Yu, H. Chen, Y. Liu, V. Craig, L.H. Li, Y. Chen, Adv. Mater. Interfaces 1 (2014) 1300002; and Y. Shang, Y. Si, A. Raza, L. Yang, X. Mao, B. Ding, J. Yu, Nanoscale 4 (2012) 7847, each incorporated herein by reference in their entirety. These few hydrophobic materials include porous ceramic membranes, hydrophobic coated meshes, modified foams and sponges, carbon-based materials, and modified fabrics. See C. Su, Y. Xu, W. Zhang, Y. Liu, J. Li, Appl. Surf. Sci. 258 (2012) 2319; J. Li, L. Yan, H. Li, J. Li, F. Zha, Z. Lei, RSC Adv. 5 (2015) 53802; Y. Lu, S. Sathasivam, J. Song, F. Chen, W. Xu, C. J. Carmalt, I. P. Parkin, J. Mater. Chem. A 2 (2014) 11628; H. Sun, A. Li, Z. Zhu, W. Liang, X. Zhao, P. La, W. Deng, ChemSusChem 6 (2013) 1057; D. Wu, Z. Yu, W. Wu, L. Fang, H. Zhu, RSC Adv. 4 (2014) 53514; J. Li, D. Li, W. Hu, J. Li, Y. Yang, Y. Wu, New J. Chem. 39 (2015) 9958; Q. An, Y. Zhang, K. Lv, X. Luan, Q. Zhang, F. Shi, Nanoscale 7 (2015) 4553; B. Lee, S. Lee, M. Lee, D. H. Jeong, Y. Baek, J. Yoon, Y. H. Kim, Nanoscale 7 (2015) 6782; J. Gu, P. Xiao, P. Chen, L. Zhang, H. Wang, L. Dai, L. Song, Y. Huang, J. Zhang, T. Chen, ACS Appl. Mater. Interfaces 9 (2017) 5968; and J. Li, L. Yan, Y. Zhao, F. Zha, Q. Wang, Z. Lei, Phys. Chem. Chem. Phys. 17 (2015) 6451, each incorporated herein by reference in their entirety. Similarly, various methods have been applied to attain hydrophobic surfaces such as electrospinning techniques, chemical vapor deposition, sol-gel methods, hydrothermal methods, and solution immersion methods. See Y. Liao, C.-H. Loh, R. Wang, A. G. Fane, ACS Appl. Mater. Interfaces 6 (2014) 16035; C.-T. Hsieh, W.-Y. Chen, F.-L. Wu, Carbon N. Y. 46 (2008) 1218; A. Venkateswara Rao, S. bS. Latthe, D. Y. Nadargi, H. Hirashima, V. Ganesan, J. Colloid Interface Sci. 332 (2009) 484; J. Li, Y. Yang, F. Zha, Z. Lei, Mater. Lett. 75 (2012) 71; and J. Li, X. Liu, Y. Ye, H. Zhou, J. Chen, J. Phys. Chem. C 115 (2011) 4726, each incorporated herein by reference in their entirety. Apart from these, other methods are also being applied for the development of hydrophobic surfaces. See J. Li, R. Wu, Z. Jing, L. Yan, F. Zha, Z. Lei, Langmuir 31 (2015) 10702, incorporated herein by reference in its entirety.

Carbon-based nanomaterials are also being explored in the fabrication of hydrophobic surfaces. Hydrophobic carbon nanotube (CNT) foams were developed by chemical vapor deposition using ferrocene in dichlorobenzene as a precursor. The foams exhibited good hydrophobic character and could remove floating oil from the surface of water. See X. Gui, J. Wei, K. Wang, A. Cao, H. Zhu, Y. Jia, Q. Shu, D. Wu, Adv. Mater. 22 (2010) 617, incorporated herein by reference in its entirety. Similarly, graphene was used to fabricate superhydrophobic surfaces on various substrates including polyurethane, polydimethylsiloxane, and melamine. See C. Wu, X. Huang, X. Wu, R. Qian, P. Jiang, Adv. Mater. 25 (2013) 5658; Y. Liu, J. Ma, T. Wu, X. Wang, G. Huang, Y. Liu, H. Qiu, Y. Li, W. Wang, J. Gao, ACS Appl. Mater. Interfaces 5 (2013) 10018; H. Yan, H. Zhou, Q. Ye, X. Wang, C. M. Cho, A. Y. X. Tan, J. Xu, RSC Adv. 6 (2016) 66834; and S. Song, H. Yang, C. Su, Z. Jiang, Z. Lu, Chem. Eng. J. 306 (2016) 504, each incorporated herein by reference in their entirety. Other carbon materials including graphene and CNTs have been used for the development of hydrophobic surfaces. See H. Wang, E. Wang, Z. Liu, D. Gao, R. Yuan, L. Sun, Y. Zhu, J. Mater. Chem. A 3 (2015) 266; C.-F. Wang, S.-J. Lin, ACS Appl. Mater. Interfaces 5 (2013) 8861; and D. D. Nguyen, N.-H. Tai, S.-B. Lee, W.-S. Kuo, Energy Environ. Sci. 5 (2012) 7908, each incorporated herein by reference in their entirety. A three-dimensional graphene aerogel foam displayed a good potential for reducing chemical and oil spill contamination. See Y. Luo, S. Jiang, Q. Xiao, C. Chen, B. Li, Sci. Rep. 7 (2017) 7162, incorporated herein by reference in its entirety.

Carbon nanofiber is another member of the carbon nanomaterial family. However, its application to oil/water removal has been limited. Zhen-Yu Wu et al. synthesized carbon nanofiber aerogels by a freeze-drying method using multiple steps. The prepared pure CNF aerogel demonstrated a good ability to remove oil. See Z.-Y. Wu, C. Li, H.-W. Liang, Y.-N. Zhang, X. Wang, J.-F. Chen, S.-H. Yu, Sci. Rep. 4 (2015) 4079, incorporated herein by reference in its entirety. However, the preparation was complex and required extreme freezing and heating conditions, for example, heating up to 1450° C., which is very energy-intensive and requires special equipment.

In view of the foregoing, one objective of the present invention is the fabrication of a superhydrophobic composite material, for example, by dip coating a polyurethane foam in a suspension of CNF. The composite material may be used for the separation of nonpolar compounds from a mixture with an aqueous solution.

BRIEF SUMMARY OF THE INVENTION

According to a first aspect, the present disclosure relates to a carbon nanofiber (CNF) grafted polyurethane composite, comprising a polyurethane foam coated with a layer of carbon nanofibers. CNF grafted polyurethane composite has a BET surface area is in a range of 220-320 m$^2$/g and an apparent contact angle with a water drop is 140°-170°.

In one embodiment, the layer of carbon nanofibers is porous with an average pore size of 2-5 nm.

In one embodiment, the polyurethane foam has an average pore diameter in a range of 200-850 µm. In one embodiment, the carbon nanofibers have an average length in a range of 5-20 µm and an average thickness in a range of 5-15 nm.

In one embodiment, the layer of carbon nanofibers further comprises carbon nanoparticles having an average diameter in a range of 1-2 µm.

In one embodiment, at least 70% of the surface of the polyurethane foam is coated with the layer of carbon nanofibers.

According to a second aspect, the present disclosure relates to a method of making the CNF grafted polyurethane composite of the first aspect. This involves the steps of contacting a polyurethane foam with a suspension of carbon nanofibers in an alcohol to produce a wet scaffold, and then drying the wet scaffold to produce the CNF grafted polyurethane composite.

In one embodiment, the polyurethane foam has a surface area in a range of 5-20 m$^2$/g.

In one embodiment, the carbon nanofibers are present in the suspension at a concentration of 0.1-5 mg/mL.

In one embodiment, the alcohol is methanol, ethanol, or isopropanol.

In one embodiment, the contacting is done for a period of 3-60 min.

In one embodiment, the drying is at a temperature of 50-80° C. for a period of 12-24 h.

In one embodiment, the contacting and drying are each repeated two more times on the CNF grafted polyurethane composite.

According to a third aspect, the present disclosure relates to a method of separating a nonpolar compound from an aqueous solution in a mixture. This involves contacting the mixture with the CNF grafted polyurethane composite of the first aspect, where the CNF grafted polyurethane composite adsorbs 20-50 times its weight of the nonpolar compound.

In one embodiment, the nonpolar compound is at least one selected from the group consisting of hexane, heptane, toluene, xylene, and a petroleum-derived liquid.

In one embodiment, the nonpolar compound is petrol.

In one embodiment, the CNF grafted polyurethane composite adsorbs less than 20% of its weight of the aqueous solution.

In one embodiment, the contacting involves filtering the mixture through the CNF grafted polyurethane composite.

In one embodiment, the method further comprises the steps of compressing the CNF grafted polyurethane composite after the contacting to produce a discharged polyurethane composite, and reusing the discharged polyurethane composite.

In a further embodiment, the discharged polyurethane composite comprises at least 95 wt % carbon nanofibers relative to a weight of carbon nanofibers in the CNF grafted polyurethane composite.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
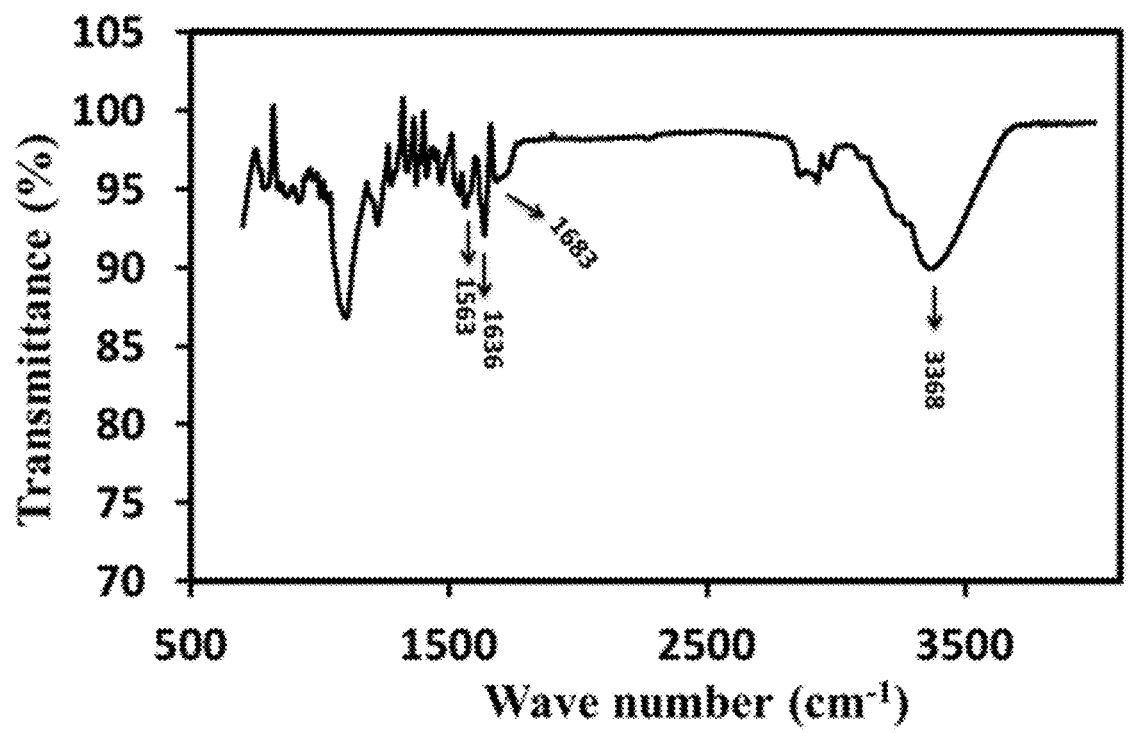
FIG. 1A is an FTIR spectrum of pure PU.
Figure 1B:
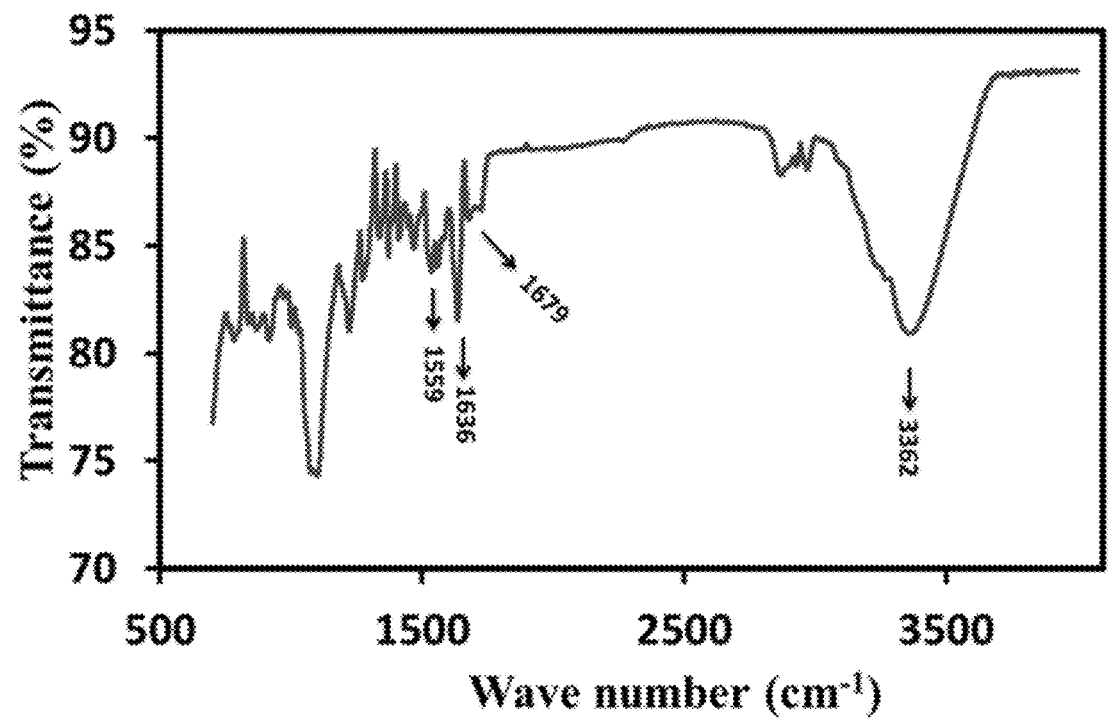
FIG. 1B is an FTIR spectrum of $g_1$-CNF grafted PU.
Figure 1C:
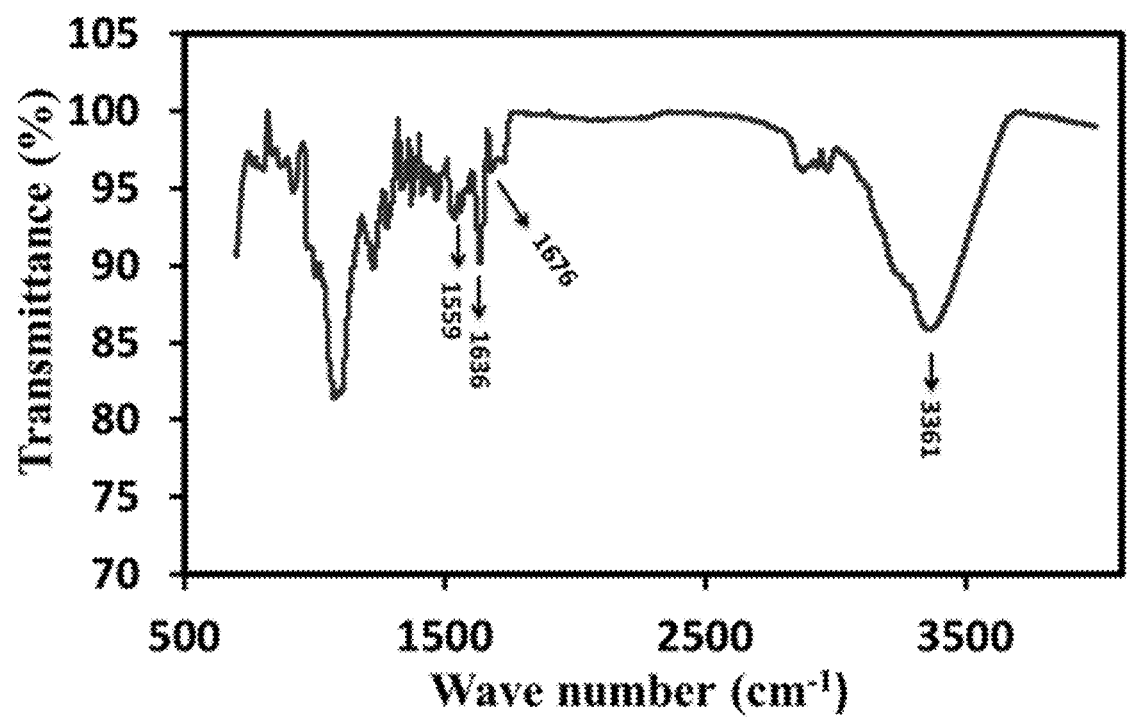
FIG. 1C is an FTIR spectrum of $g_2$-CNF grafted PU.
Figure 1D:
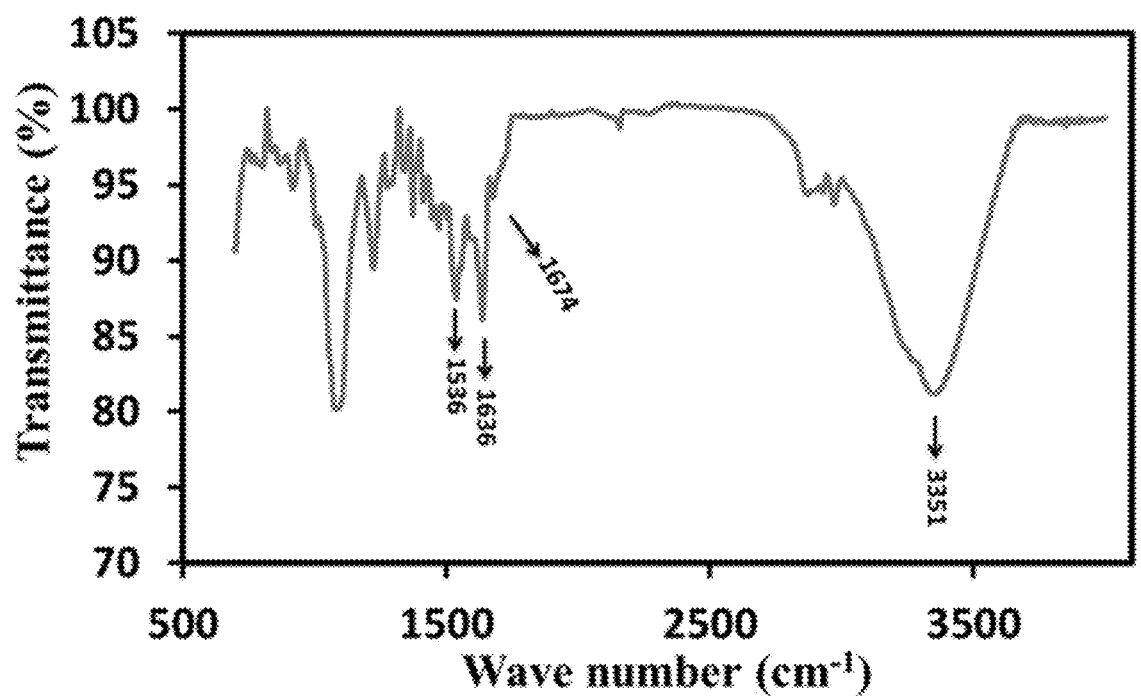
FIG. 1D is an FTIR spectrum of $g_3$-CNF grafted PU.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

For polygonal shapes, the term "diameter", as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Figure 2A:
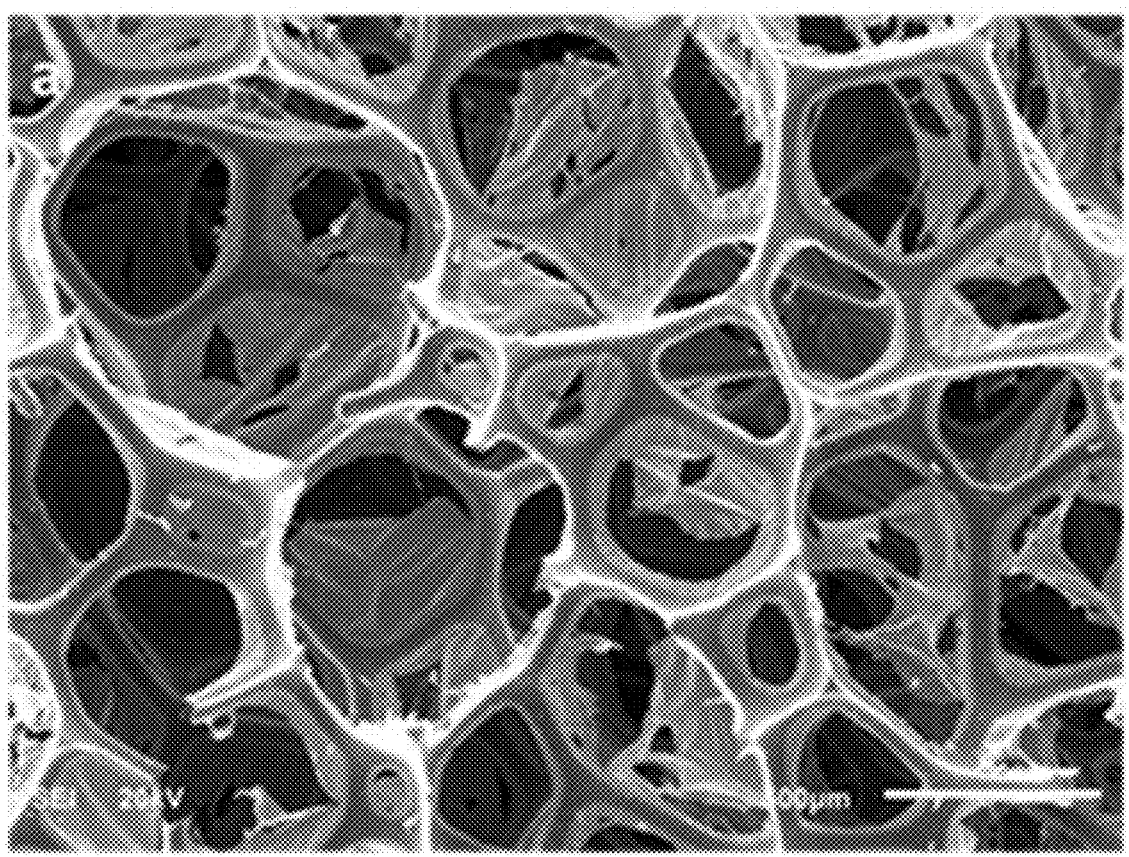
FIG. 2A is an SEM image of PU, scale bar 500 µm.

According to a first aspect, the present disclosure relates to a carbon nanofiber (CNF) grafted polyurethane composite, comprising a polyurethane foam coated with a layer of carbon nanofibers. The polyurethane foam has an average pore diameter in a range of 200-850 μm, preferably 300-700 μm, more preferably 350-600 μm, though in some embodiments, a polyurethane foam having an average pore diameter of less than 200 μm or greater than 850 μm may be used. Here, the pore diameter is determined by SEM imaging, such as the SEM image of FIG. 2A. In one embodiment, at least 70%, preferably at least 75%, more preferably at least 80% of the surface of the polyurethane foam is coated with the layer of carbon nanofibers. Here, the surface of the polyurethane foam refers to both the interior surface (for instance, within the pores), and the exterior surface of the foam. In some embodiments, the polyurethane foam may be considered similar to low-resilience (i.e. flexible) polyurethane, memory foam, or SORBOTHANE.

In one preferred embodiment, the polyurethane foam has an open-cell structure. Solid foams can be closed-cell or open-cell. In closed-cell foam, the gas forms discrete pockets, i.e. cells, each completely surrounded by the solid material. In open-cell foam, the cells connect to each other, and fluid paths usually exist from one side of the foam to the other side. Thus, open-cell foams may be used to filter or absorb fluids.

In one embodiment, the polyurethane foam is an open-cell foam with cells having an average diameter in a range of 220-900 μm, preferably 320-750 μm, more preferably 370-650 μm, though in some embodiments, a polyurethane foam having an average cell diameter of less than 220 μm or greater than 900 μm may be used. In one embodiment, the polyurethane foam may be considered an open-cell foam despite comprising a percentage of closed cells. For instance, the polyurethane foam may comprise 1-20%, more preferably 2-16%, or 3-5% closed cells, relative to a total number of closed cells and open cells.

In one embodiment, the polyurethane foam may comprise open cells having a monodisperse diameter. Here, the diameter of a cell refers to the longest length through the center of the cell. This means that the cells have a coefficient of variation or relative standard deviation, expressed as a percentage and defined as the ratio of the cell diameter standard deviation ($\sigma$) to the cell diameter mean ($\mu$), multiplied by 100%, of less than 25%, preferably less than 10%, preferably less than 8%, preferably less than 6%, preferably less than 5%. In another embodiment, the cells are monodisperse having a diameter distribution ranging from 80% of the average cell diameter to 120% of the average cell diameter, preferably 85-115%, preferably 90-110% of the average cell diameter. In another embodiment, the polyurethane foam comprises open cells that do not have monodisperse diameters.

In one embodiment, the polyurethane foam may comprise open cells that are substantially rounded, meaning that the distance from the geometric center to anywhere defining the boundary of the cell varies by less than 35%, preferably by less than 25%, more preferably by less than 20% of the average distance.

In general, due to the relative thinness of the layer of CNF on the polyurethane foam, the above descriptions of the cell structure are equally applicable to the cell structure of the CNF grafted polyurethane composite.

In other embodiments, materials with a similar flexibility and porosity to polyurethane foam may also be used, for instance, polyester, polystyrene, vegetal cellulose, or natural sponges. Other materials colloquially known as "plastic foam" or "synthetic sponges" may be used. Plastic foams include ethylene-vinyl acetate (EVA) foam (formed from copolymers of ethylene and vinyl acetate and also referred to as polyethylene-vinyl acetate, PEVA), low-density polyethylene (LDPE) foam, nitrile rubber foam, polychloroprene foam or NEOPRENE, polyimide foam, polypropylene (PP) foam (including expanded polypropylene and polypropylene paper), polyethylene foam, polyvinyl chloride (PVC) foam, closed-cell PVC foam, silicone foam, and microcellular foam. The polyurethane foam may also be considered as a scaffold or substrate for the carbon nanofibers.

Carbon nanofibers (CNFs) include both vapor grown carbon fibers (VGCFs) and vapor grown carbon nanofibers (VGCNFs). These are typically cylindrical nanostructures with graphene layers arranged as stacked cones, cups, or plates. Carbon nanofibers may be solid or hollow. Carbon nanofibers with graphene layers wrapped into cylinders are called carbon nanotubes (CNTs). CNTs may be single-walled or multi-walled nanotubes. CNFs may have outer diameters ranging from about 1, 2, 5, 10, 20, 50, 100, 200, 500, or <1,000 nm. CNFs may be untreated or may be further treated with one or more films, coatings, or absorptive materials. CNFs may be further functionalized. The carbon nanofibers may also contain or be comprised of other elements in addition to carbon including, but not limited to, nitrogen, boron, oxygen, sulfur, and mixtures thereof.

The carbon nanofibers utilized in this invention may be produced using any production method including, but not limited to, laser vaporization techniques, electric arc techniques, gas phase techniques, and chemical vapor deposition. In laser vaporization and electric arc techniques, the CNFs are produced by vaporizing graphite with or without a metal catalyst present using either a laser beam or an electric arc, respectively. In gas phase techniques, a carbon source is usually run across a bed of catalyst particles under pressure and heat to produce normally a continuous stream of CNFs. Chemical vapor deposition usually involves the use of a precursor compound that under proper conditions (heat, pressure, etc.), with or without the aid of a catalyst, will decompose to form carbon nanofibers.

In one embodiment, the carbon nanofibers have an average length in a range of 5-20 µm, preferably 7-18 µm, more preferably 10-15 µm, and an average thickness in a range of 5-15 nm, preferably 6-12 nm, more preferably 7-10 nm. However, in other embodiments, the carbon nanofibers may have an average length of less than 5 µm or greater than 20 µm, and/or an average thickness of less than 5 nm or greater than 15 nm. In one embodiment, the carbon nanofibers have an average length in a range of 20-50 µm, 50-200 µm, 200-500 µm, or 500 µm-1 mm. The average length and average thickness as described above refers to the average of the lengths or the thicknesses of individual carbon nanofibers. In some cases, two or more carbon nanofibers may be twisted, stuck, or bundled together, leading to a greater combined thickness and/or combined length.

In one embodiment, the layer of carbon nanofibers further comprises carbon nanoparticles having an average diameter in a range of 1-2 µm, preferably 1.1-1.9 µm, more preferably 1.2-1.8 µm, though in some embodiments, the layer may further comprise carbon nanoparticles having an average diameter of less than 1 µm or greater than 2 µm. The nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. In one embodiment, the carbon nanoparticles may be substantially spherical, meaning that the distance from the nanoparticle centroid (center of mass) to anywhere on the nanoparticle outer surface varies by less than 30%, preferably by less than 20%, more preferably by less than 10% of the average distance.

In one embodiment, the carbon nanoparticles may be present within agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the carbon nanoparticles having a mean diameter as previously described.

In one embodiment, the layer of carbon nanofibers further comprises carbon nanotubes at a weight percentage of 5-80 wt %, preferably 10-60 wt %, more preferably 12-20 wt %, relative to a total weight of the carbon nanofibers. In some embodiments, the carbon nanofibers may comprise greater than 80 wt % carbon nanotubes. However, in another embodiment, the CNF grafted polyurethane composite does not contain carbon nanotubes, or may contain less than 1 wt % carbon nanotubes, preferably less than 0.2 wt % carbon nanotubes, relative to a total mass of carbon.

In one embodiment, the layer of carbon nanofibers has an average thickness of 500 nm-4.5 µm, preferably 1-4 µm, more preferably 1.5-3.5 µm on the polyurethane surface. However, in some embodiments, the layer of carbon nanofibers may have an average thickness of less than 500 nm or greater than 4.5 µm. The carbon nanofibers may form a disorganized, dense meshwork where only 0.5-5%, preferably 1-3% of the carbon nanofibers, relative to the total number of carbon nanofibers, directly contact the polyurethane surface.

Figure 3A:
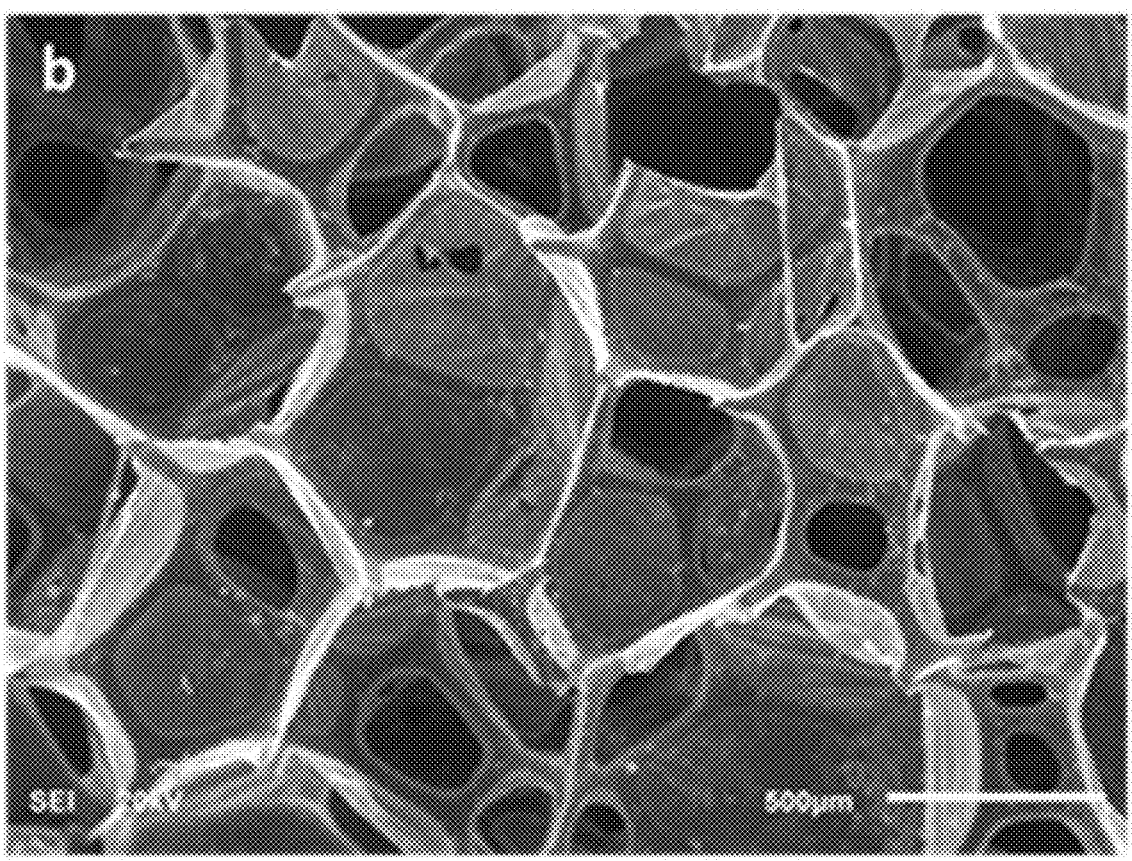
FIG. 3A is an SEM image of $g_1$-CNF grafted PU, scale bar 500 µm.
Figure 3B:
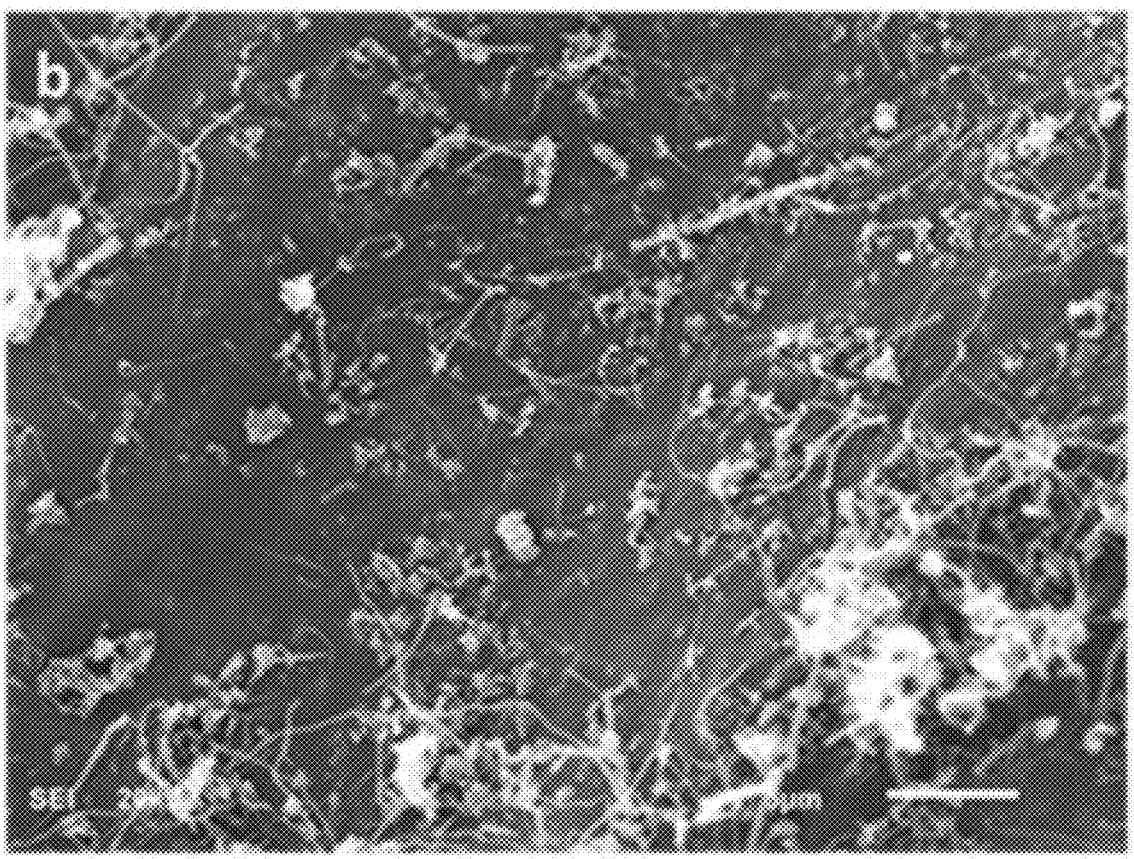
FIG. 3B is an SEM image of $g_1$-CNF grafted PU at a higher magnification, scale bar 5 µm.
Figure 4A:
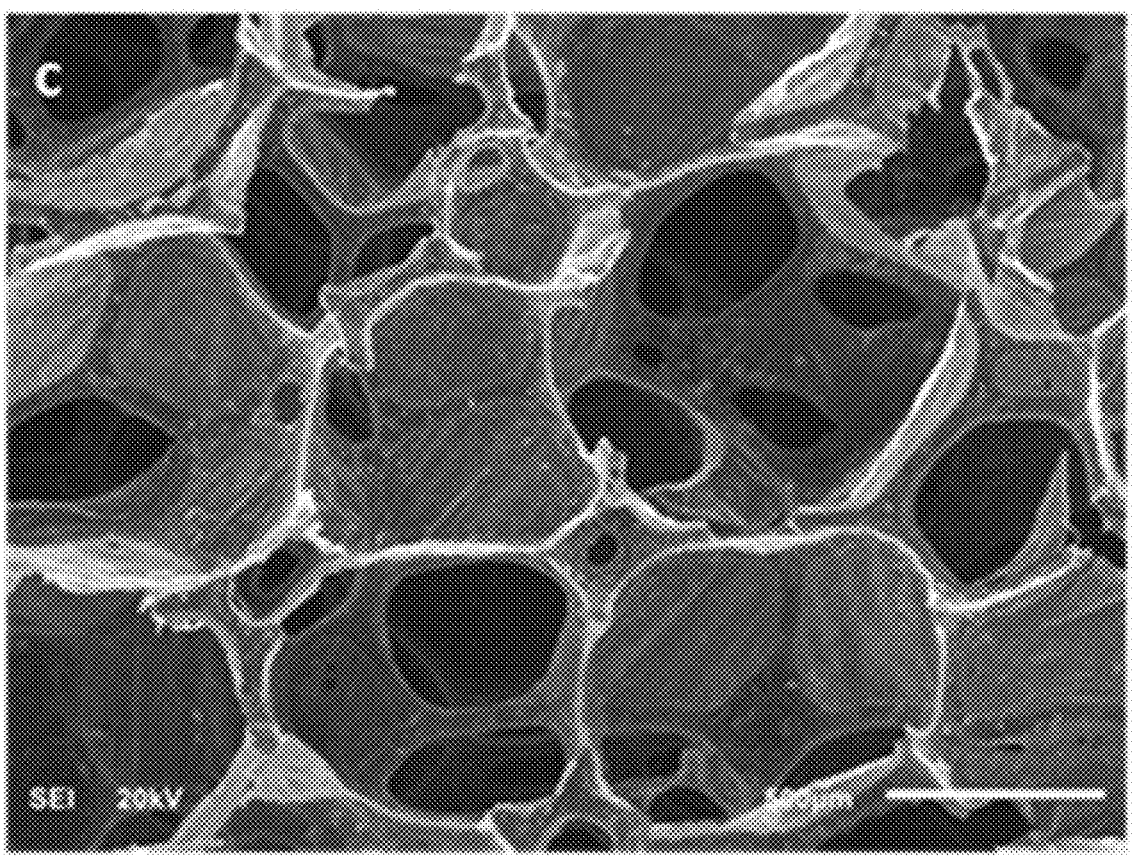
FIG. 4A is an SEM image of $g_2$-CNF grafted PU, scale bar 500 µm.
Figure 4B:
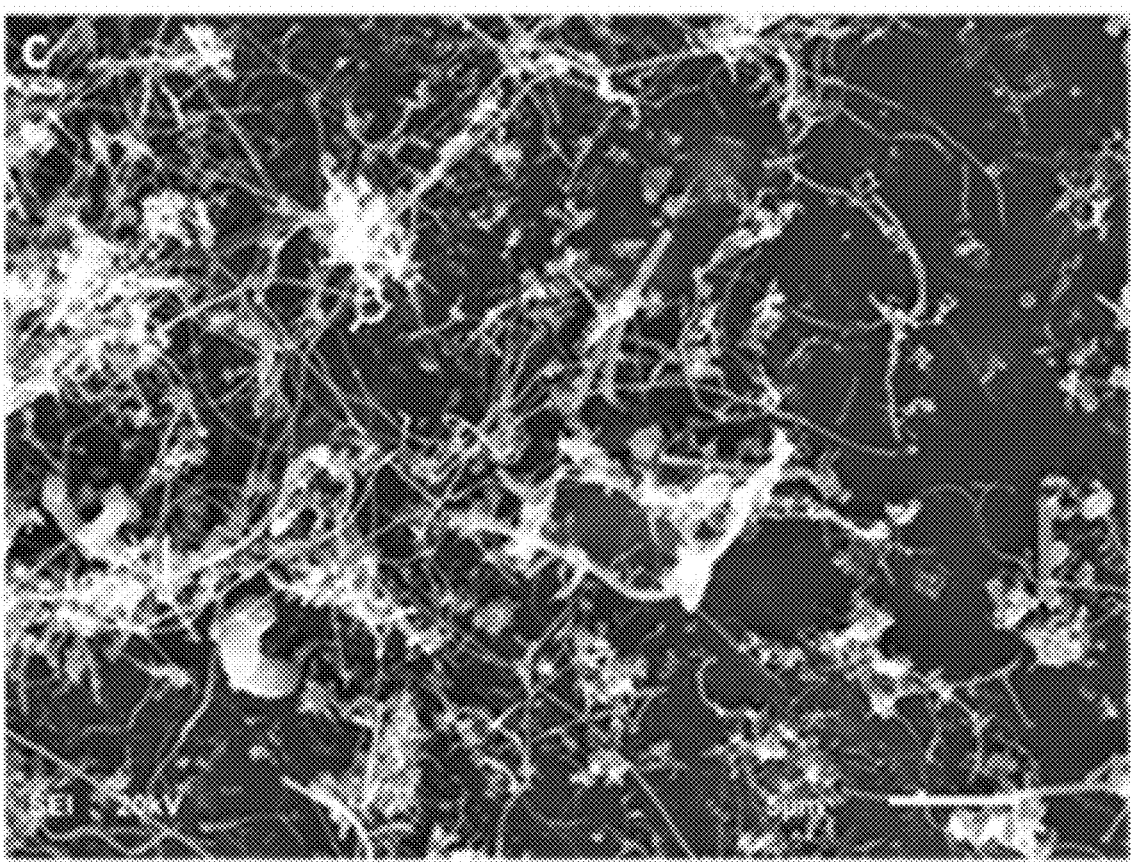
FIG. 4B is an SEM image of $g_2$-CNF grafted PU at a higher magnification, scale bar 5 µm.
Figure 5A:
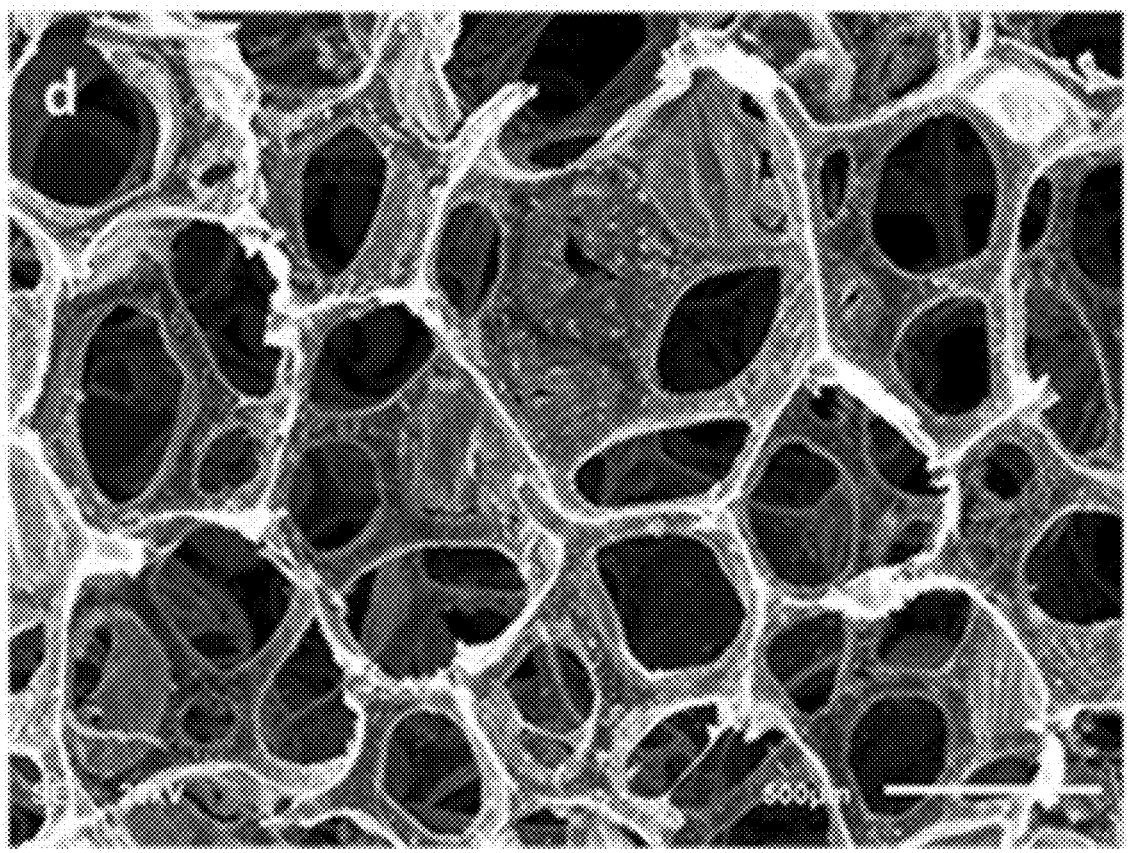
FIG. 5A is an SEM image of $g_3$-CNF grafted PU, scale bar 500 µm.
Figure 5B:
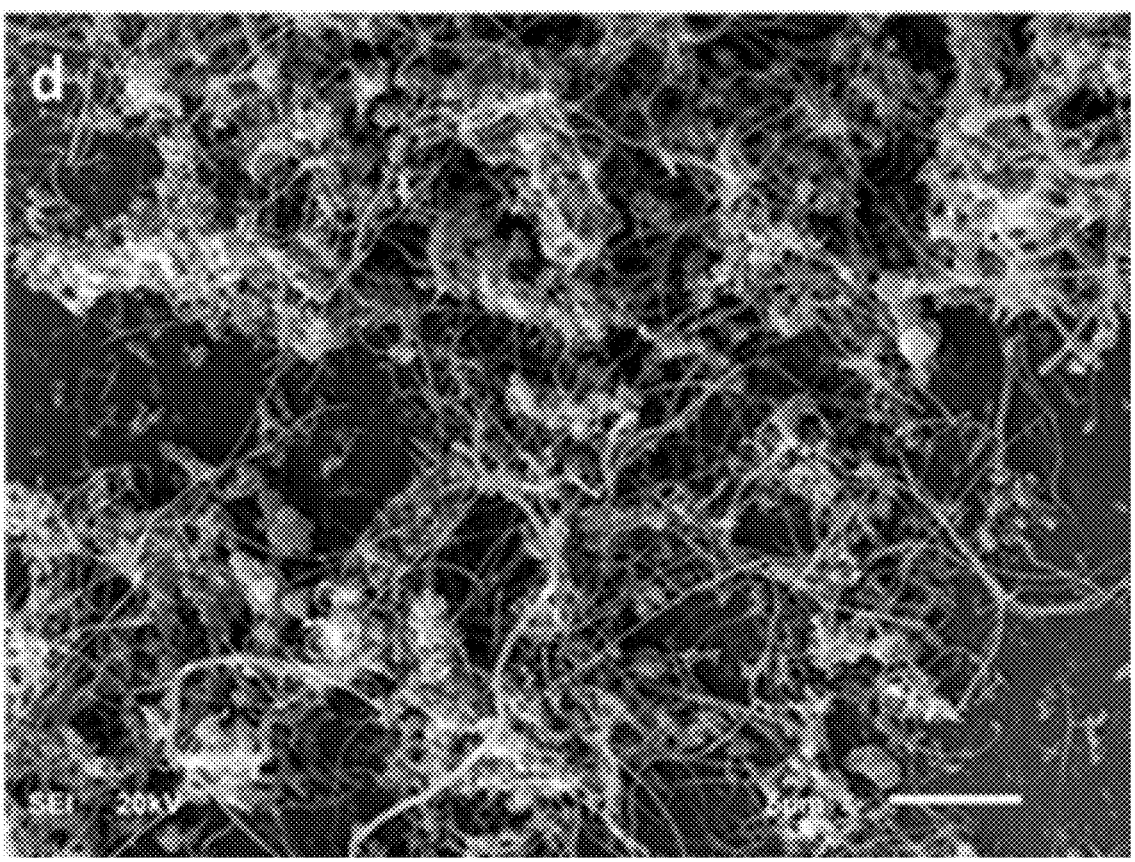
FIG. 5B is an SEM image of $g_3$-CNF grafted PU at a higher magnification, scale bar 5 µm.

In one embodiment, due to the adsorption of the carbon nanofibers in the preparation of the CNF grafted polyurethane composite, the carbon nanofibers generally lay flat against the nearest surface of the polyurethane foam structure, as can be observed in FIGS. 3B, 4B, and 5B, for example. In a related embodiment, the carbon nanofibers do not protrude from the polyurethane surface. Carbon nanofibers, even those attached from or in contact by only one end to the polyurethane surface, may be attached at an angle or attached substantially perpendicularly (i.e. forming an angle 70°-110° with the polyurethane surface) and then curved or bent to lay flat.

In one embodiment, the CNF grafted polyurethane composite has a BET surface area in a range of 220-320 m$^2$/g, preferably 250-300 m$^2$/g, more preferably 260-290 m$^2$/g, though in some embodiments, the BET surface area may be less than 220 m$^2$/g or greater than 320 m$^2$/g. In some embodiments, the BET surface area may be dependent on the number of times the polyurethane foam is contacted with the CNF during the fabrication of the CNF grafted polyurethane composite. For instance, in one embodiment, a CNF grafted polyurethane composite that is contacted only once with the CNF may have a BET surface area in a range of 75-140 m$^2$/g, preferably 85-130 m$^2$/g, more preferably 100-120 m$^2$/g. Likewise, a CNF grafted polyurethane composite that is contacted only twice with the CNF, with a drying step in between the contacting, may have an increased surface area, for instance, a BET surface area in a range of 140-220 m$^2$/g, preferably 145-200 m$^2$/g, more preferably 150-170 m$^2$/g. A CNF grafted polyurethane composite that is contacted at least three times with the CNF, with a drying step in between each contacting step, may have a further increased surface area, for instance, a BET surface area in a range of 220-320 m$^2$/g, preferably 250-300 m$^2$/g, more preferably 260-290 m$^2$/g.

In one embodiment, the CNF grafted polyurethane composite has an average pore size (determined by adsorption/desorption isotherms) of 2-5 nm, preferably 2.5-4.5 nm, more preferably 2.7-4.2 nm, though in some embodiments, the average pore size may be larger than 5 nm. In a related embodiment, since the CNF grafted polyurethane composite surface exposed to adsorption/desorption isotherms is primarily the layer of CNF, it may be equivalent to say that the layer of CNF is porous with an average pore size of 2-5 nm, preferably 2.5-4.5 nm, more preferably 2.7-4.2 nm.

In one embodiment, the layer of CNF may have a bulk density of 0.001-1.0 g/cm$^3$, preferably 0.005-0.20 g/cm$^3$, more preferably 0.01-0.15 g/cm$^3$. In one embodiment, the layer of CNF may comprise nanofibers having curved portions having a radius of curvature of 100 nm-5 µm, preferably 500 nm-4 µm, more preferably 900 nm-3 µm. In one embodiment, while the CNF may have an average length in a range of 5-20 µm, preferably 7-18 µm, more preferably 10-15 µm as previously mentioned, the CNF may have an average end-to-end distance in a range of 0.5-15.0 µm, preferably 0.8-10.0 µm, more preferably 1.0-7.5 µm, due to kinks and curves in the fiber. Preferably the CNF each have two ends, however, in some embodiments, a single CNF may have more than two ends, for instance, due to splitting, branching, or adhesion with another fiber. In one embodiment, the layer of CNF covers 50-90%, more preferably 60-80%, even more preferably 70-80% of the polyurethane surface area, meaning that from a certain view angle normal to the polyurethane surface, only 10-50%, preferably 20-40%, even more preferably 20-30% of the polyurethane surface is visible.

In one embodiment, the CNF grafted polyurethane composite has an apparent contact angle of 140°-170°, preferably 142°-160°, more preferably 145°-155° with a water drop. This contact angle may be observed by placing a drop of water on the surface of the CNF grafted polyurethane composite, for instance, by pipetting 40-60 µL of water onto the CNF grafted polyurethane composite, or by spraying a mist of water droplets. Preferably, a goniometer may be used to measure the contact angles. In another embodiment, drop sizes of 40-60 µL may be used to observe contact angles The CNF grafted polyurethane composite may be considered hydrophobic or superhydrophobic, where a superhydrophobic material has an apparent contact angle of 150° or greater with water. The CNF grafted polyurethane composite may also be considered oleophilic.

According to a second aspect, the present disclosure relates to a method of making the CNF grafted polyurethane composite of the first aspect. This involves the steps of contacting a polyurethane foam with a suspension of carbon nanofibers in an alcohol to produce a wet scaffold, and then drying the wet scaffold to produce the CNF grafted polyurethane composite.

In one embodiment, the polyurethane foam has a BET surface area in a range of 5-20 m$^2$/g, preferably 6-18 m$^2$/g, more preferably 7-15 m$^2$/g, though in some embodiments, the polyurethane foam may have a BET surface area of less than 5 m$^2$/g or greater than 20 m$^2$/g. An average pore size of the polyurethane foam as determined by adsorption/desorption isotherms, may be in a range of 100 nm-1 µm, preferably 150-800 nm, more preferably 200-750 nm. In another embodiment, other types of foams or sponges, as previously mentioned, may be used for contacting the suspension of CNF.

The suspension of CNF refers to a dispersed or solubilized mixture of CNF which does not settle, even with centrifugation. In one embodiment, the carbon nanofibers are present in the suspension at a concentration of 0.1-5 mg/mL, preferably 0.2-3 mg/mL, more preferably 0.8-2 mg/mL, or about 1 mg/mL. The suspension may be made by contacting the carbon nanofibers with a solvent, such as an alcohol, in order that the carbon nanofibers may be dispersed in the alcohol.

In one embodiment, the carbon nanofibers are dispersed in an alcohol which may be benzyl alcohol, cyclohexanol, pentyl alcohol, phenol, 1-propanol, methanol, ethanol, butanol, isopropanol, or mixtures thereof. Preferably the alcohol is methanol, ethanol, butanol, or isopropanol. In a preferred embodiment, the alcohol is ethanol. In other embodiments, other solvents and liquids may be used for forming the CNF suspension. The solvent may be organic or aqueous, such as, for example, water, chloroform, chlorobenzene, water, acetic acid, acetone, acetonitrile, aniline, benzene, benzonitrile, bromobenzene, bromoform, carbon disulfide, carbon tetrachloride, cyclohexane, decalin, dibromethane, diethylene glycol, diethylene glycol ethers, diethyl ether, diglyme, dimethoxymethane, N,N-dimethylformamide, ethylamine, ethyl benzene, ethylene glycol ethers, ethylene glycol, ethylene glycol acetates, propylene glycol, propylene glycol acetates, ethylene oxide, formaldehyde, formic acid, glycerol, heptane, hexane, iodobenzene, mesitylene, methoxybenzene, methylamine, methylene bromide, methylene chloride, methylpyridine, morpholine, naphthalene, nitrobenzene, nitromethane, octane, pentane, terpineol, texanol, carbitol, carbitol acetate, butyl carbitol acetate, dibasic ester, propylene carbonate, pyridine, pyrrole, pyrrolidine, quinoline, 1,1,2,2-tetrachloroethane, tetrachloroethylene, tetrahydrofuran, tetrahydropyran, tetralin, tetra methylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solvent may be a halogenated organic solvent such as 1,1,2,2-tetrachloroethane, chlorobenzene, chloroform, methylene chloride, 1,2-dichloroethane, or chlorobenzene.

A preferred method of forming a suspension of carbon nanofibers is by sonication. For example, a given amount of CNF is contacted or mixed with a given solvent and subjected to sonication for a given period of time, for instance, 5 min-2 h, preferably 10 min-1 h, more preferably 20-45 min, or about 30 min. The sonicator may be a bath sonicator or a sonicating horn or probe tip. In alternative embodiments, a different method of forming a suspension of carbon nanofibers may be used, for instance, media milling, shaking, or high-shear mixing. In one embodiment, cold water, such as by chilling with refrigeration or with ice, may be used as a bath to keep the sonication from overheating the suspension.

Preferably the contacting involves submerging the polyurethane foam within the suspension. For submerging, preferably a ratio of the polyurethane foam bulk volume to the suspension volume is 1:1,000-1:1, preferably 1:50-1:1, more preferably 1:5-1:1. However, dip-coating may be used with the polyurethane foam being only partially submerged at any one time, but the foam may be rotated to ensure an even coating.

In other embodiments, the contacting involves spraying, dropping the suspension onto the polyurethane foam, injecting the suspension inside the foam, or rotating the foam with the suspension. The polyurethane foam may be compressed and then slowly expanded or decompressed while contacting in order to encourage a flow of the suspension to the inside of the foam. Particularly, when the polyurethane foam is submerged in the suspension, compressing and decompressing the foam may drive out air bubbles by filling pores of the foam with the suspension.

In one embodiment, the contacting is done for a period of 3-60 min, preferably 3.5-45 min, more preferably 4-30 min, even more preferably about 5 min. However, in some embodiments, the contacting may be done for a period of time much longer than 60 minutes, for instance, a polyurethane foam may be kept submerged in a CNF suspension for 12-24 hours, or overnight.

In one embodiment, the drying is at a temperature of 50-80° C., preferably 55-75° C., more preferably 58-65° C., even more preferably about 60° C. for a period of 12-24 h, preferably 14-20 h, or about 18 h or overnight. In another embodiment, the drying may be done at a temperature lower than 50° C., for instance, 40-45° C. In other embodiments, a desiccator may be used. Following the drying period, the CNF grafted polyurethane composite is produced.

In one embodiment, the contacting and drying are each repeated two more times on the CNF grafted polyurethane composite. This repeated contacting may increase the amount of CNF deposited on the composite by allowing additional CNF to adsorb to the existing layer of CNF or to adsorb to uncovered regions of polyurethane. As mentioned previously, the repeated contacting may increase the BET surface area of the composite by creating a thicker layer of CNF. For instance, in one embodiment, a CNF grafted polyurethane composite that is contacted only once with the CNF may have a BET surface area in a range of 75-140 $m^2/g$, preferably 85-130 $m^2/g$, more preferably 100-120 $m^2/g$. Likewise, a CNF grafted polyurethane composite that is contacted only twice with the CNF, with a drying step in between the contacting, may have an increased surface area, for instance, a BET surface area in a range of 140-220 $m^2/g$, preferably 145-200 $m^2/g$, more preferably 150-170 $m^2/g$. A CNF grafted polyurethane composite that is contacted at least three times with the CNF, with a drying step in between each contacting step, may have a further increased surface area, for instance, a BET surface area in a range of 220-320 $m^2/g$, preferably 250-300 $m^2/g$, more preferably 260-290 $m^2/g$. A CNF grafted polyurethane composite with a higher BET surface area may have a higher adsorption capacity for non-polar compounds, or may have a greater hydrophobicity than a CNF grafted polyurethane composite with a lower BET surface area. Similarly, repeated contacting with the suspension of CNF may decrease the average pore size of the composite. For instance, the average pore size of the polyurethane foam, determined by adsorption/desorption isotherms, may be in a range of 250-300 nm; the average adsorption/desorption pore size of the CNF grafted polyurethane composite contacted only once with the CNF suspension may be in a range of 75-150 nm; the average adsorption/desorption pore size of the composite contacted only twice with the CNF suspension may be in a range of 25-60 nm; the average adsorption/desorption pore size of the composite contacted only three times with the CNF suspension may be in a range of 2-10 nm. In alternative embodiments, the CNF grafted polyurethane composite may be contacted with the CNF suspension for a total of 4, 5, or more times.

In a preferred embodiment, the entire method of making the CNF grafted polyurethane composite does not involve the use of silanes or a silanization reaction. In another embodiment, the entire method of making the CNF grafted polyurethane composite does not involve heating any materials at temperatures above 80° C. In other embodiments, the heating is primarily used for the drying step, thus, drying temperatures of 80° C., 70° C., 60° C., 50° C., or lower may set the maximum temperature involved in the entire process. In some embodiments, where the drying uses a desiccator at room temperature, the entire method may be carried out at temperatures of no greater than room temperature. In certain cases, while sonicating to form a suspension of CNF, active cooling may be required to maintain low maximum pressures.

According to a third aspect, the present disclosure relates to a method of separating a nonpolar compound from an aqueous solution in a mixture. This involves contacting the mixture with the CNF grafted polyurethane composite of the first aspect, where the CNF grafted polyurethane composite adsorbs the nonpolar compound. In the context of this disclosure, the CNF grafted polyurethane composite adsorbing the nonpolar compound is considered equivalent to the composite absorbing the nonpolar compound.

In one embodiment, the mixture may be a contaminated water mixture. The mixture may come from petroleum extraction or processing. In other embodiments, the contaminated water mixture may come from an ocean, a bay, a river, a lake, a swamp, a pond, a pool, a fountain, a bath, an aquarium, a water treatment plant, a sewage treatment plant, a desalination plant, a manufacturing plant, a chemical plant, a textile plant, a power plant, a gas station, a food processing plant, a restaurant, a dry cleaners, or some other place that may generate contaminated water mixtures, or contaminated oil-water mixtures. In some embodiments, the contaminated water mixture may be in the form of an emulsion.

In one embodiment, the nonpolar compound may adopt a liquid state at room temperature (20-27° C.). The nonpolar compound may be a linear or branched alkane with a general formula of $C_nH_{2n+2}$, where n may have a value of 5-18, preferably 10-17, more preferably 12-16. In another embodiment, the nonpolar compound may have a surface tension at 19-22° C. of 10-50 mN/m, preferably 15-40 mN/m, more preferably 20-35 mN/m. In other embodiments, the nonpolar compound may be some other organic molecule with a nonpolar or hydrophobic character and similar surface tension. In other embodiments, the nonpolar compound may be a mixture of organic molecules, for instance, a plant-based oil or a petroleum product such as mineral oil. In one embodiment, the nonpolar compound is at least one selected from the group consisting of hexane, heptane, octane, toluene, xylene, and a petroleum-derived liquid. In one embodiment, the nonpolar compound is a petroleum-derived liquid, such as petrol (gasoline). In one embodiment, the nonpolar compound is hexane.

In another embodiment, other organic contaminants may be present in either aqueous solution or as a nonpolar compound. The organic contaminant may be an herbicide, a fungicide, a pesticide, a pharmaceutical compound, a steroid, a microbial toxin, a metabolite, a disinfection byproduct, an arsenic-containing compound, a food byproduct, a dye, or some other organic molecule. Preferably the contaminant is one or more unwanted compounds known as an environmental pollutant.

In one embodiment, the mixture comprises the nonpolar compound at a volume percent concentration of 0.5-50%, preferably 2-45%, more preferably 4-35% relative to a total volume of the mixture. The nonpolar compound may be emulsified or dispersed throughout the mixture, may float at the top of the mixture, or some combination of both. In an alternative embodiment, the mixture may not contain oil or a non-polar liquid phase.

The mixture may comprise the aqueous solution at a volume percent concentration of 50-99.5%, preferably 55-98%, more preferably 65-96% relative to a total volume of the mixture.

Due to the oleophilic nature of the composite, contacting the CNF grafted polyurethane composite with the mixture allows the composite to adsorb 20-50 times its weight of the nonpolar compound.

Preferably the CNF grafted polyurethane composite adsorbs 25-45 times its weight of the nonpolar compound, more preferably about 27 times it weight of the nonpolar compound. However, in some embodiments, the CNF grafted polyurethane composite may adsorb less than 20 times its weight of the nonpolar compound, for instance, if the total volume of the nonpolar compound is relatively small and/or the mass of the composite is relatively large. In other embodiments, it may be possible for a CNF grafted polyurethane composite to adsorb greater than 50 times its weight of the nonpolar compound. In one embodiment, a CNF grafted polyurethane composite may be reused for at least 5 cycles, at least 10 cycles, or at least 15 cycles, with the weights of the nonpolar compound being adsorbed at each cycle having a relative standard deviation (RSD) of 5% or less, preferably 4% or less, more preferably 3% or less.

In some embodiments, the CNF grafted polyurethane composite may additionally adsorb a small amount of aqueous solution with the contacting. Preferably the CNF grafted polyurethane composite adsorbs less than 20%, preferably less than 10%, more preferably less than 5%, even more preferably less than 1% of its weight of the aqueous solution. In some cases, this small amount of aqueous solution adsorption may be due to areas within the composite that have exposed polyurethane without a layer of CNF.

In one embodiment, the method further comprises the steps of compressing or squeezing the CNF grafted polyurethane composite after the contacting to produce a discharged (or used) polyurethane composite and a volume of nonpolar compound and reusing the discharged polyurethane composite. A used CNF grafted polyurethane composite may also be cleaned or rinsed with solvents or other reagents before reuse. In some embodiments, a used CNF grafted polyurethane composite may be contacted again with the CNF suspension and/or dried, prior to reuse.

In a further embodiment, the discharged polyurethane composite comprises at least 95 wt %, preferably at least 97 wt %, more preferably at least 99 wt % carbon nanofibers relative to a weight of carbon nanofibers in the CNF grafted polyurethane composite. In other words, the contacting and then compressing of the composite results in a loss of less than 5 wt %, preferably less than 3 wt %, more preferably less than 1 wt % of the initial weight of carbon nanofibers. A small or negligible loss of carbon nanofibers means that the CNF grafted polyurethane composite may be successfully reused multiple times, and preferably the reused CNF grafted polyurethane composite maintains an adsorption capacity that allows the composite to adsorb 20-50 times its weight of the nonpolar compound. However, in some embodiments, the adsorption capacity, in terms of the weight percentage of the nonpolar compound relative to a weight of the composite, may decrease by 2%, 1%, or by less than 1% with each use cycle.

In one embodiment, the contacting involves filtering the mixture through the CNF grafted polyurethane composite. The mixture may or may not be pre-processed, for instance, by filtering through a coarse filter to remove large particulate matter, or by exposure to UV light or ozone. Filtering the mixture through the CNF grafted polyurethane composite means that a portion or all of the mixture passes through one area on an external surface of the CNF grafted polyurethane composite (the "feed side"), and that a permeate elutes and exits from some other area of the external surface of the composite (the "permeate side"). CNF grafted polyurethane composite may be attached within a vessel or within a tubing, or at the end of a vessel or at the end of a tubing. Preferably, for filtering a polar and nonpolar phase-separated mixture, the feed side touches at least the nonpolar phase.

In one embodiment, the filtering leaves a retained aqueous phase that is more than 90%, preferably more than 95%, more preferably more than 99%, even more preferably more than 99.5% of the total weight of the aqueous phase in the mixture before the contacting. The mixture may be filtered by the force of gravity, by siphoning, by pouring, or by applying suction or positive pressure.

In one embodiment of the filtering, a pressure difference across the feed side to the permeate side of the CNF grafted polyurethane composite is 0-5 kPa, preferably 0-4 kPa, more preferably 0-3 kPa. Here, the pressure difference may be created solely by the weight of a mixture on the feed side meaning that the filtration is gravity driven. Alternatively, the pressure difference may be created by a pump, a vacuum pump, a piston, a compressed gas, centrifugation, evaporation, or water jet aspiration. Preferably the pressure is constant, though in alternative embodiments, the pressure may be varied. In one embodiment, the nonpolar compound permeates through CNF grafted polyurethane composite at a flow speed of 0.5-20.0 mm/s, preferably 1.0-10.0 mm/s, more preferably 2.5-7.5 mm/s. In other embodiments, flow speeds of 20-50 mm/s or greater than 50 mm/s may be possible.

The examples below are intended to further illustrate protocols for preparing, characterizing the CNF grafted polyurethane composite and uses thereof, and are not intended to limit the scope of the claims.

EXAMPLE 1

Materials

All chemicals and reagents were analytical grade and used without further purification. Toluene and acetone were purchased from the Merck (Germany). Hexane, heptane, and o-xylene were obtained from the Sigma-Aldrich (Germany). Ethanol was attained from Baker Analyzed® Reagent. Throughout the experiment, distilled water was used from a lab assembled distillation unit.

Instrumentation

Fourier transfer infrared spectroscopy (FTIR) was performed using a Thermo Scientific NICOLET iS10. The BET surface area and pore size of the pure and different CNF grafted materials were measured using Micromeritics TRISTAR II PLUS instrument. A Thermo-Scientific magnetic stirrer was used for rotating and stirring of the CNF dispersed ethanol during the CNF grafting process. The distilled water was collected from a homemade distillation unit. A BLUE M oven was used for curing and drying the different materials. A Masterflex EASY-LOAD® peristaltic pump was used with a speed controller for the dynamic separation of oil from water.

Fabrication of g-CNF Grafted Polyurethane

A piece of PU (polyurethane foam) was sonicated for 30 minutes in acetone to remove any particles inside, and then the piece was dried in an oven. The CNF dispersion was prepared in ethanol (1 mg/mL) by sonication for 30 minutes. The piece of PU was dipped and stirred for 5 minutes in the CNF containing ethanol dispersion to produce the $g_1$-CNF grafted PU. After 5 minutes, the $g_1$-CNF grafted PU was dried in an oven at 60° C. Similar to before, it was dipped again for another 5 minutes to attain $g_2$-CNFgrafted PU, which was also dried at 60° C. After drying, it was dipped for a third grafting, also for five minutes. After third grafting, the $g_3$-CNF grafted PU was put in the oven overnight for the curing process. During the curing process, the CNF is anchored on the PU surface and within its pores. The obtained material was labeled as PU, $g_1$-CNF grafted PU, $g_2$-CNF grafted PU, and $g_3$-CNF grafted PU.

EXAMPLE 2

Results and Discussion
Characterization

FTIR was used as one of the tools to observe the CNF and PU interaction after grafting. Peak shift and the appearance or disappearance of peaks indicate important changes. FTIR analysis has shown some notable changes in the FTIR spectra of PU and g-CNF grafted PU. FTIR spectra of the pure polyurethane can be seen in FIG. 1A. The prominent peaks at 3368 $cm^{-1}$ and 1563 $cm^{-1}$ may be due to the stretching and deformation vibration of the N—H bond. In the FTIR spectra, no characteristic asymmetric stretching vibration of NCO was observed at 2270 $cm^{-1}$, and this is an indication that there is no free NCO functionality due to polymerization. See Y. Peng, Z. Zheng, P. Sun, X. Wang, T. Zhang, New J. Chem. 37 (2013) 729, incorporated herein by reference in its entirety. The peaks at 2850-2975 $cm^{-1}$ result from $CH_2$ and $CH_3$. The carbonyl stretch peak was assigned to vibration at 1683 $cm^{-1}$. See Z. Jian, H. Yong, X. Ming, N. Jun, Prog. Org. Coatings 66 (2009) 35, incorporated herein by reference in its entirety. The FTIR spectra of the g-CNF grafted PU were slightly different from the pure PU. However, the CNF grafting into PU has clearly shown peak shift. Most importantly, only a few peaks are shifted and those are attributed to the functional groups. Moreover, the shift was regular as the grafted CNF concentration increased by dip coating. The N—H stretching, CO, and N—H deformation vibration peaks were shifted from 3367 to 3351 $cm^{-1}$, from 1682 to 1674 $cm^{-1}$, and from 1563 to 1536 $cm^{-1}$, respectively. These shifts indicate that the polyurethane basic structure is retained during CNF grafting, and the peak shift indicated that CNF is grafted into the polyurethane through such functional groups.

Morphological Study of the CNF Grafted Polyurethane

Figure 2B:
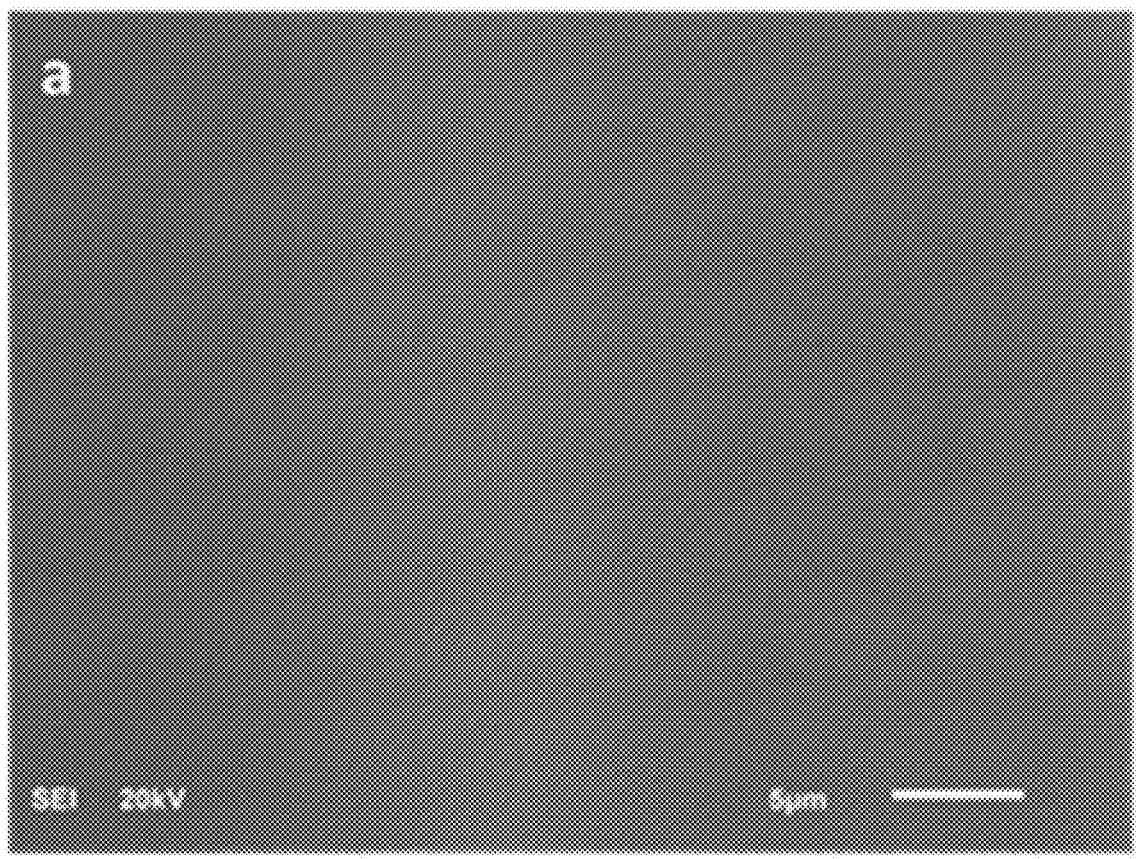
FIG. 2B is an SEM image of PU at a higher magnification, scale bar 5 µm.

The surface study of the pristine and the CNF grafted polyurethane was evaluated using scanning electron microscopy (SEM). Pristine polyurethane demonstrated a three-dimensional porous morphology. An SEM image of the pristine polyurethane (FIG. 2A) shows pores having diameters in the range of 150 to 900 μm. The porous morphology of the polyurethane additionally provides channels for retaining or passing of water and oil. A high-resolution SEM image (FIG. 2B) of the pristine polyurethane surface displays a plane surface without any extended portions. This is an indication that prior to CNF grafting, the surface of the PU is entirely planar and no roughness on the surface is noticeable. The SEM images of the g-CNF grafted PU (FIGS. 3A, 4A, and 5A) demonstrated a porous three-dimensional morphology similar to pristine polyurethane. This morphology shows that the grafting of CNF has no apparent effect on the shape of the porosity of the material. However, the SEM images at high resolution (FIGS. 3B, 4B, and 5B, scale bar, 5 μm) show fibers on the surface of the PU that form sub-channels. The presence of CNF provides the roughness and more channels with small porosity enhancing the hydrophobicity of the larger pores. The CNF growth on the surface of the PU was substantially enhanced as the grafting process moved from the first to third dip coating. Therefore, the further grafting provided no significant enhancement. The ultimate $g_3$-CNF grafted PU was selected because it showed enough growth of the CNF on the surface of the polyurethane, which CNF is responsible for the highly hydrophobic character (FIG. 5B).

Figure 6:
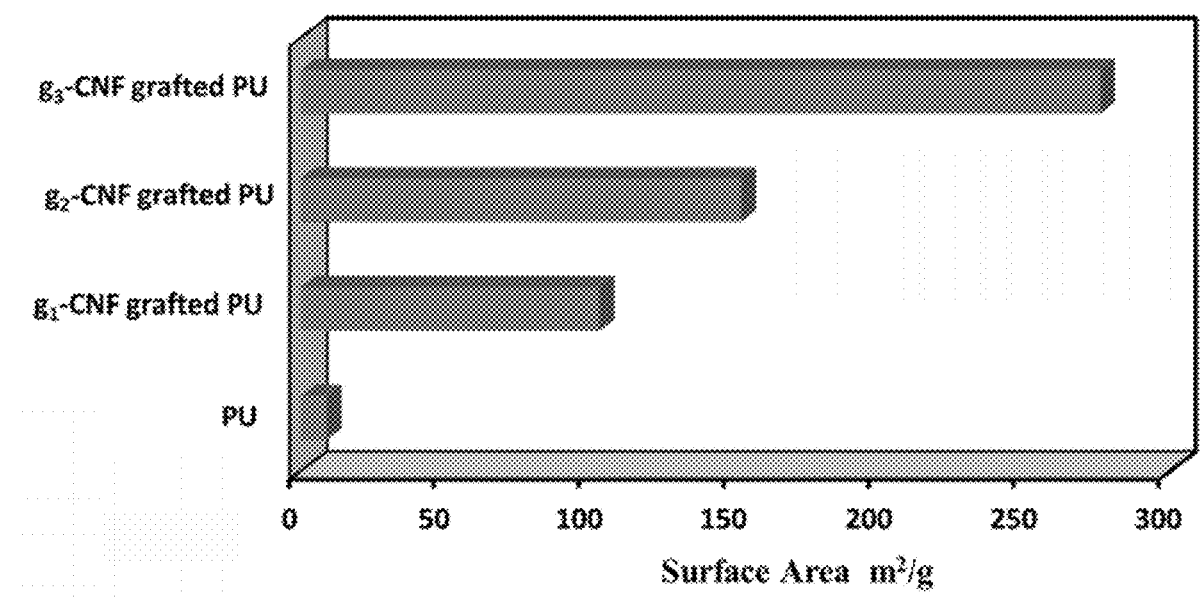
FIG. 6 is a comparison of BET surface areas of PU and the $g_1$, $g_2$, and $g_3$-CNF grafted PU samples.

The surface area and the porosity of the PU and the fabricated CNF grafted PU were investigated using nitrogen adsorption and desorption isotherms. Through this adsorption and desorption of nitrogen, the BET surface areas of the modified and unmodified material were calculated. The BET surface area results revealed that grafting of CNF has a substantial effect on the surface area of the PU, as it is evident from the FIG. 6. The regular increment in the surface area was found as the growth of the CNF on the PU surface increased. The pure PU has a very low surface area of 9 $m^2/g$, and it was increased significantly after the first grafting of CNF to 103 $m^2/g$. It was continuously improved, and the $g_3$-CNF grafted PU surface area was 276 $m^2/g$, which represents an increase of 31 times the pristine PU surface area. The adsorption is directly related to the surface area and porosity of the material. CNF grafting has shown a significant effect on the pore size of the PU. The pure PU has shown the large adsorption and desorption pore sizes of 2,567 and 2,569 Å, respectively. The CNF grafting considerably reduced the pore size and a regular trend was observed as grafting moved from $g_1$ to $g_3$. These results showed that the CNF reduced the average pore size from 2,567 to 36 Å. The pore size is directly related to surface area. The pure PU has small surface area due to large pore size. The CNF grafted PU has large surface area and small pore size. This is an indication that CNF generated a porous network on the PU surface, and that porous network contributed to reducing the pore size significantly. It is clear from the SEM images that large channels remain unchanged in the PU before and after the grafting of CNF. The significant decrease in the average pore size is due to the generation of new pores by the CNF which also involved the huge increase in the surface area. The CNF provided additional pores and new channels that significantly improved the oil adsorption. Due to the large surface area and the small pore size of the hydrophobic surface, the CNF grafted PU provided less chance to the slippage of the water from it. It also enhanced the capillary effect of the material for the intake of the oil.

EXAMPLE 3

Separation Evaluation—Static Removal of Oil

Water and oil taking capabilities of the variously modified foams were investigated using a mixture of the hexane and water colored with methylene blue for visualization purpose. The behavior of the polyurethane was sharply changed before and after CNF grafting. The raw polyurethane before CNF grafting was able to adsorb both water and the oil. The commercially available PU is hydrophilic in nature and it has a great capability to adsorb water and oil. See H. Wang, E. Wang, Z. Liu, D. Gao, R. Yuan, L. Sun, Y. Zhu, J. Mater.

Chem. A 3 (2015) 266—incorporated herein by reference in its entirety. It was also evident when the commercial PU was dipped into the water and hexane that a huge quantity of water was absorbed along with hexane. This behavior was also observed when the piece of the raw polyurethane was dipped into the mixture of the n-hexane and the water. It was almost half submerged in the water and half submerged in the n-hexane. The hydrophobicity of the polyurethane foam was controlled by a rotating dip coating method with CNF. The polyurethane foam was kept in the CNF dispersed ethanol solution for five minutes, during this period the CNF was grafted into the PU. After every dip coating, the CNF loaded PU was dried and cured for overnight in the oven to give anchoring time to CNF into the polyurethane porous network. The overnight dried foam was also investigated in the mixture of hexane and water. It was observed that first dip grafted CNF PU still adsorbs water with n-hexane, and however, the water adsorbing capability is significantly reduced compared to raw PU. The hydrophobicity of the PU was further improved by the second dipping into CNF ethanol. This sample demonstrated that hydrophobicity was significantly enhanced, and this time PU only adsorbed a few drops of water while rest of the adsorbed liquid was hexane. The superhydrophobicity of the PU was attained with the $3^{rd}$ dipping, and this time the CNF grafted PU did not absorb any water and only hexane was taken by the PU. The water drops can be clearly seen in the magnified image of the $2^{nd}$ dipped CNF-PU, while such water drops are entirely absent in the $3^{rd}$ dipped CNF-PU. The dip grafting may be used as one parameter to control the hydrophobicity of the surface. The CNF grafting process may be continued until the PU rejects water completely. Moreover, the hydrophobic behavior of the PU and the differently-modified PU can also be seen in the mixture of the n-hexane and water. Most of the PU was in the water; the $1^{st}$ dipped CNF grated PU was partly in the water; and the $2^{nd}$ dipped CNF grafted PU was slightly in the water with and rest of it in the n-hexane. Interestingly, the $3^{rd}$ dipped CNF grafted PU just floated on the n-hexane and no part of it was in the water. Further coating showed no significant difference. Therefore, $g_3$-CNF grafted PU was used as the best grafting. All these measurements were done by pressing the sample twice in the bottom of the beaker containing the n-hexane and methylene blue-water mixture. It can be observed that the pure PU adsorbs water to the point of its surface turning blue due to methylene blue in the water. However, this color is absent in the CNF grafted PU, which shows that CNF grafting on the surface extensively improved the hydrophobicity and prevented water penetration.

A drop of water was placed on the surface of the $g_3$-CNF grafted PU. The drop of water is thoroughly rejected by the surface without any passing through the grafted PU. The apparent contact angle (CA) of the water with the $g_3$-CNF grafted surface is about 150°. A similar experiment was tried with a drop of hexane placed on the surface; however, as the hexane touched the surface, it was quickly absorbed by the $g_3$-CNF grafted PU. This behavior of the $g_3$-CNF grafted PU towards the drop of hexane is evidence that the surface is highly oleophilic, and the taking of oil was so fast due to the capillary action reinforced by the CNF.

EXAMPLE 4

Separation Evaluation—Dynamic Removal of Oil

For separating larger volumes of oil-water mixture, it is preferred to use a dynamic system for separation. Therefore, the capacity of the prepared material was tested using the dynamic system. The presence of these refined and highly hydrophobic capillaries may be applied for the separation of the bulk of oil from water. This is especially advantageous when dealing with oil spillage, where a large quantity of oil is present on a body of water. The bulk mixture of the hexane and the water was used to evaluate the separation efficiency of the prepared materials. This was achieved by fitting the grafted PU into the pipe. This was achieved very easily due to its mechanical stability and flexibility. The fitted foam was inserted into the mixture of hexane and the methylene blue colored water so that some part of the foam was in contact with each phase. A peristaltic pump was used to create pressure for taking up hexane from the mixture of water and oil. As the peristaltic pump was started, it was observed that hexane moved very fast through the $g_3$-CNF grafted PU without taking any water. After some time, in the beaker, there was only methylene blue colored water, and almost all the hexane was separated and removed from the mixture. Moreover, after the removal of hexane, the peristaltic pump was left on to see if any water would be taken up. Due to the pressure of the pump, only bubbles of air were observed passing through the tubing, while no methylene blue colored water passed through. This is a clear indication that the fabricated $g_3$-CNF grafted PU is highly hydrophobic and oleophilic. Due to ease of preparation, its cost-effectiveness, and its unique hydrophobic and oleophilic properties, the $g_3$-CNF grafted PU is proven to be a valuable material for the removal of oil spillage from contaminated water.

EXAMPLE 5

Reproducibility and Intake of Different Petrol Components

The separation capacity and the reproducibility of the CNF grafted PU was investigated with different oils, non-polar solvents, and it was also applied to a real sample of petrol mixed with water. The reproducibility of the grafted PU was studied by hexane solvent. For this purpose, the weight of the dry $g_3$-CNF grafted PU was measured and then it was dipped into the hexane solvent. After that, its weight was again measured to find out the intake of n-hexane. The weight gain ratio was calculated by applying the following formula:

Weight gain ratio (%)=(weight of the solvent adsorbed $g_3$-CNF grafted PU)/(weight of the dry $g_3$-CNF grafted PU)*100

CNF grafted PU has shown superb reproducibility for the intake of hexane after multiple cycles. The weight gain ratio for hexane was found in the range of 2650% to 2750% calculated by the above mentioned formula. The RSD (n=15) was found to be 1-2%. The small variation in the multiple cycles demonstrated that developed hydrophobic material showed good reproducibility and could be used multiple times for separation of oil or contaminants from water. The behavior of the $g_3$-CNF grafted PU was also observed for other organic solvents. The weight gain ratio was found to depend on the density of the organic solvent. The organic solvent with higher density showed a greater weight ratio. However, it demonstrated good separation capability for the hexane, heptane, toluene, and o-xylene. The weight gain ratio was in the range of 2600% to 5000% calculated by the above-mentioned formula. It was also applied to the real sample of petrol mixed with water and the weight gain ratio was 3258%. This huge increment of the weight ratio of the $g_3$-CNF-grafted PU demonstrated that it has excellent capability for the absorption of various nonpolar organic solvents including petrol.

Moreover, its facile synthesis results in a porous hydrophobic network attained with CNF grating and a good reproducibility. The carbon nanofiber not only imparts the hydrophobic character to the PU, it also significantly improves the surface area from 9 to 276 $m^2/g$. It also substantially reduces the pore size (determined by adsorption/desorption) from 2,567 to 36 Å, which provide more surface area and the strong capillary action for oil adsorption. The oil adsorption capability of the surface after grafting was significantly enhanced and it adsorbs the oil as it touches the surface while retaining the water drops and not allowing the water drops to pass through it. The contact angle of water was found to be 150°, which demonstrated the high hydrophobicity of the surface. The curing process provides the stability to the surface and it can be used for multiple time absorption processes. The maximum weight gain absorption capacity was found to be 3258%. The adsorbed nonpolar component can be released very easily just by compressing the CNF grafted PU. Under pressure, its structure does not collapse, and upon releasing the pressure, the CNF grafted PU easily regains its shape. Additionally, the CNF grafted PU may be used as a filter for bulk oil spillage. It may prove an efficient oil separation hydrophobic material due to its mechanical stability, chemical inertness, large surface area, small pore size, and facile fabrication.

The invention claimed is:

1. A carbon nanofiber (CNF) grafted polyurethane composite, comprising:
    a polyurethane foam coated with a layer of carbon nanofibers,
    wherein a BET surface area is in a range of 220-320 $m^2/g$, and
    wherein an apparent contact angle with water is 140°-170°.

2. The CNF grafted polyurethane composite of claim 1, wherein the layer of carbon nanofibers is porous with an average pore size of 2-5 nm.

3. The CNF grafted polyurethane composite of claim 1, wherein the polyurethane foam has an average pore diameter in a range of 200-850 μm.

4. The CNF grafted polyurethane composite of claim 1, wherein the carbon nanofibers have an average length in a range of 5-20 μm and an average thickness in a range of 5-15 nm.

5. The CNF grafted polyurethane composite of claim 1, wherein the layer of carbon nanofibers further comprises carbon nanoparticles having an average diameter in a range of 1-2 μm.

6. The CNF grafted polyurethane composite of claim 1, wherein at least 70% of the surface of the polyurethane foam is coated with the layer of carbon nanofibers.

7. A method of making the CNF grafted polyurethane composite of claim 1, comprising:
    contacting a polyurethane foam with a suspension of carbon nanofibers in an alcohol to produce a wet scaffold, and
    drying the wet scaffold to produce the CNF grafted polyurethane composite.

8. The method of claim 7, wherein the polyurethane foam has a surface area in a range of 5-20 $m^2/g$.

9. The method of claim 7, wherein the carbon nanofibers are present in the suspension at a concentration of 0.1-5 mg/mL.

10. The method of claim 7, wherein the alcohol is methanol, ethanol, butanol, or isopropanol.

11. The method of claim 7, wherein the contacting is done for a period of 3-60 min.

12. The method of claim 7, wherein the drying is at a temperature of 50-80° C. for a period of 12-24 h.

13. The method of claim 7, wherein the contacting and drying are each repeated two more times on the CNF grafted polyurethane composite.

14. A method of separating a nonpolar compound from an aqueous solution in a mixture, the method comprising:
    contacting the mixture with the CNF grafted polyurethane composite of claim 1,
    wherein the CNF grafted polyurethane composite adsorbs 20-50 times its weight of the nonpolar compound.

15. The method of claim 14, wherein the nonpolar compound is at least one selected from the group consisting of hexane, heptane, toluene, xylene, and a petroleum-derived liquid.

16. The method of claim 14, wherein the nonpolar compound is petrol.

17. The method of claim 14, wherein the CNF grafted polyurethane composite adsorbs less than 20% of its weight of the aqueous solution.

18. The method of claim 14, wherein the contacting involves filtering the mixture through the CNF grafted polyurethane composite.

19. The method of claim 14, further comprising:
    compressing the CNF grafted polyurethane composite after the contacting to produce a discharged polyurethane composite, and
    reusing the discharged polyurethane composite.

20. The method of claim 19, wherein the discharged polyurethane composite comprises at least 95 wt % carbon nanofibers relative to a weight of carbon nanofibers in the CNF grafted polyurethane composite.

* * * * *